No. 762,197. PATENTED JUNE 7, 1904.
L. R. ROGERS.
STEERING APPARATUS FOR MOTOR VEHICLES.
APPLICATION FILED APR. 20, 1903.
NO MODEL.
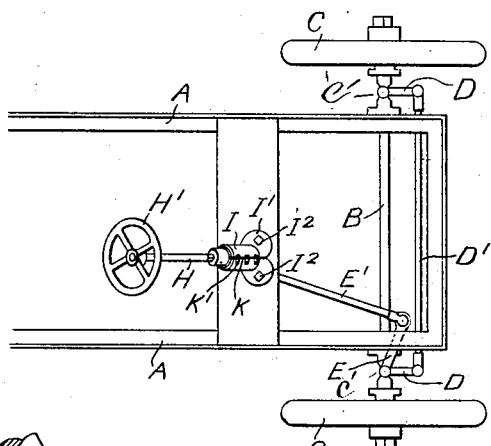
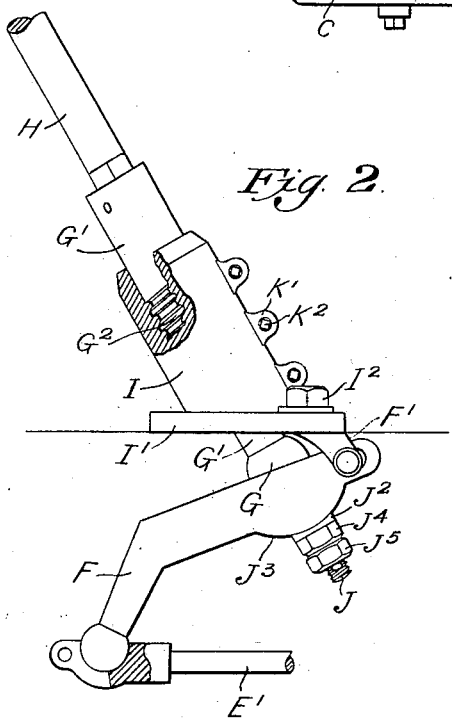
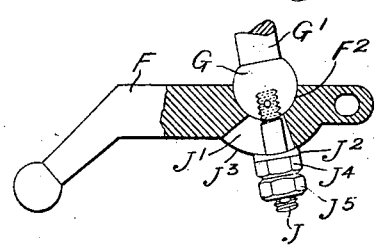
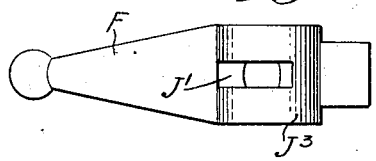
Witnesses
L. H. Homer
Penelope Comberbach.
Inventor
Leonard R. Rogers
By Rufus B. Fowler
Attorney.

No. 762,197. Patented June 7, 1904.

UNITED STATES PATENT OFFICE.

LEONARD R. ROGERS, OF WORCESTER, MASSACHUSETTS, ASSIGNOR TO WILLIAM H. GATES, OF WORCESTER, MASSACHUSETTS.

STEERING APPARATUS FOR MOTOR-VEHICLES.

SPECIFICATION forming part of Letters Patent No. 762,197, dated June 7, 1904.

Application filed April 20, 1903. Serial No. 153,384. (No model.)

*To all whom it may concern:*

Be it known that I, LEONARD R. ROGERS, a citizen of the United States, residing at Worcester, in the county of Worcester and Commonwealth of Massachusetts, have invented a new and useful Improvement in Steering Apparatus for Motor-Vehicles, of which the following is a specification, accompanied by drawings forming a part of the same, in which—

Figure 1 is a plan view of the steering apparatus of a motor-vehicle. Fig. 2 is a side elevation of so much of the steering apparatus as embodies my present invention. Fig. 3 is a side view, partly in section, of a portion of the steering apparatus; and Fig. 4 is a bottom view of the lever shown in side view in Fig. 3.

Similar letters of reference refer to simliar parts in the different views.

My present invention has for its object to provide a simple and efficient device for steering motor-vehicles, which shall obviate the lost motion due to excessive wear of the actuating parts, and I accomplish this object by means of a shaft capable of an endwise movement or thrust due to the rotative movement of a screw-threaded member, as hereinafter described; and my invention consists in the novel features of construction and arrangement of parts, as pointed out in the annexed claims.

Referring to the accompanying drawings, A denotes a portion of the framework on which the body and operating mechanism of a motor-vehicle are supported; B, the front axle, and C C the forward or steering wheels, rotating on bearings having a pivotal connection with the front axle at $C'$ $C'$, as is common in vehicles of this class. The wheels C C have a simultaneous movement on their pivotal connections by means of arms D D, which are coupled together by a link $D'$, and the movement of the wheels C C to direct the course of the vehicle is accomplished by providing the pivot of one of the wheels with a radial arm E, which serves as an actuating-lever, the angular movement of which is imparted to the wheels C C in order to turn the vehicle to the right or the left. This portion of the guiding mechanism, however, forms no part of my present invention as it is now in common use in motor-vehicles.

The lever E is connected by a link $E'$ with the free end of a lever F, pivoted at one end to a bracket $F'$, attached to a portion of the framework of the vehicle. The lever F is provided with a semispherical recess or socket $F^2$ to receive the spherical end G, formed on the shaft $G'$, which has a screw-thread $G^2$ and at its upper end a socket adapted to receive the squared end of the steering-post H. The shaft $G'$ carries at its upper end a steering-wheel $H'$ in suitable position to be rotated by the attendant. The screw-threaded section of the shaft $G'$ is engaged by a fixed nut I, having a flange $I'$ at its lower end, by which it is attached to the framework by means of bolts $I^2$, so that the rotation of the steering-wheel $H'$ will impart an endwise movement to the shaft $G'$ upward or downward, according to the direction the wheel $H'$ is turned. The shaft $G'$ is operatively connected with the lever F by means of a bolt J, which is screwed into or otherwise attached to the spherical end G of the screw-threaded shaft $G'$. The bolt J extends through a slot or opening $J'$ in the lever F and carries on its lower end a washer $J^2$, curved to fit a cylindrical surface $J^3$, which is concentric with the spherical socket $F^2$. The washer $J^2$ is held in place by a nut $J^4$ and a check-nut $J^5$. The connection between the screw-threaded shaft $G'$ and the lever F permits of the rotative and endwise movements of the shaft $G'$ and of the angular movement of the lever F. The fixed nut I is open on one side, as at K, and is provided with lugs $K'$, which may be drawn toward each other by bolts $K^2$ in order to contract the opening K and compensate for the wear on the screw-threaded shaft $G'$ and nut I.

The operation of my device is as follows: Assuming the wheels C C to be in their normal position or parallel with the frame A, the rotation of the steering-wheel $H'$ in one direction will cause the shaft $G'$ to move downwardly, thereby depressing the lever F and swinging the wheels C C in one direction on their pivotal connection with the axle B, while the rotation of the steering-wheel H' in the other direction will move the shaft G' upward and elevate the lever F, causing the wheels C C to swing in the opposite direction. The power required to rotate the wheel H' is multiplied by the screw and applied with great force to move the lever F, and the wearing-surface of the screw-thread is sufficiently large to avoid any lost motion due to wear by continued use.

By the employment of a fixed nut rigidly attached to the framework of the vehicle the entire apparatus is very rigidly and firmly supported, and the action of the screw is so smooth and powerful that a sense of security and effectiveness is obtained.

What I claim as my invention, and desire to secure by Letters Patent, is—

1. In a steering apparatus for motor-vehicles, the combination with a wheel arranged to support the framework and having a pivotal connection therewith, of a screw-threaded shaft, means for rotating the same, a fixed nut engaging said shaft, connecting mechanism by which said screw-threaded shaft is operatively connected with said pivoted supporting-wheel, said fixed nut having means for taking up wear, substantially as described.

2. In a steering apparatus for motor vehicles, the combination with the framework of the vehicle, of a tubular nut attached to said frame, said nut having a longitudinal slot or opening on one side, means for contracting said opening to compensate for wear, a screw-threaded shaft engaging said nut, means for rotating said shaft, and a pivoted lever operatively connected with said shaft, substantially as described.

3. In a steering device for motor-vehicles, the combination of a rotatable screw-threaded shaft having a spherical end, a fixed nut engaging said shaft, a lever pivoted at one end and provided with a spherical recess to receive the end of said shaft and having a slot for a bolt, and a cylindrical surface concentric with said spherical recess, a bolt attached to said screw-threaded shaft, a concave washer filling the cylindrical surface on said lever, and means for holding said washer in place, substantially as described.

4. In the steering apparatus of a motor-vehicle, the combination with a fixed nut, of a screw-threaded shaft engaging said nut, a supporting-wheel capable of varying its alinement with the frame of the vehicle, intermediate mechanism between said supporting-wheel and said screw-threaded shaft, whereby the endwise movement of said shaft will vary the alinement of said supporting-wheel, and a detachable steering-post attached to said threaded shaft, substantially as described.

5. In the steering apparatus of a motor-vehicle, the combination with a framework comprising an axle, of a pair of supporting-wheels pivotally connected on vertical axes with said axle, connecting mechanism to secure a simultaneous swinging movement of said wheels, mechanism for swinging said wheels comprising a pivoted lever, and a screw-threaded shaft having a ball-and-socket connection with said lever and means for moving said screw-threaded shaft endwise, substantially as described.

Dated this 17th day of April, 1903.

LEONARD R. ROGERS.

Witnesses:
 PENELOPE COMBERBACH,
 RUFUS B. FOWLER.